United States Patent
Haddad et al.

(10) Patent No.: US 8,931,067 B2
(45) Date of Patent: Jan. 6, 2015

(54) ENABLING SEAMLESS OFFLOADING BETWEEN WIRELESS LOCAL-AREA NETWORKS IN FIXED MOBILE CONVERGENCE SYSTEMS

(75) Inventors: Wassim Haddad, San Jose, CA (US); Samy Touati, Pleasanton, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 221 days.

(21) Appl. No.: 13/362,977

(22) Filed: Jan. 31, 2012

(65) Prior Publication Data

US 2013/0198817 A1   Aug. 1, 2013

(51) Int. Cl.
 G06F 21/00   (2013.01)
 H04W 12/04  (2009.01)
 H04W 12/06  (2009.01)
 G06F 21/43   (2013.01)

(52) U.S. Cl.
 CPC ............... H04W 12/06 (2013.01); G06F 21/43 (2013.01)
 USPC ................................ 726/5; 380/270; 713/168

(58) Field of Classification Search
 None
 See application file for complete search history.

(56) References Cited

U.S. PATENT DOCUMENTS

| | | | |
|---|---|---|---|
| 6,370,380 B1 | 4/2002 | Norefors et al. | |
| 7,792,527 B2 * | 9/2010 | Wu et al. | 455/435.1 |
| 8,340,711 B1 * | 12/2012 | Glass et al. | 455/552.1 |
| 2004/0203783 A1 * | 10/2004 | Wu et al. | 455/436 |
| 2007/0140220 A1 * | 6/2007 | Doradla et al. | 370/352 |
| 2008/0065752 A1 * | 3/2008 | Ch'ng et al. | 709/223 |
| 2008/0070577 A1 * | 3/2008 | Narayanan et al. | 455/436 |
| 2008/0212535 A1 * | 9/2008 | Karaoguz et al. | 370/331 |
| 2009/0170519 A1 * | 7/2009 | Wilhoite et al. | 455/436 |
| 2009/0264123 A1 * | 10/2009 | Agashe et al. | 455/434 |
| 2010/0020777 A1 * | 1/2010 | Nakajima | 370/338 |
| 2011/0072121 A1 * | 3/2011 | Takasugi et al. | 709/222 |
| 2011/0196962 A1 * | 8/2011 | Radier et al. | 709/224 |
| 2012/0044914 A1 * | 2/2012 | Chen et al. | 370/338 |

FOREIGN PATENT DOCUMENTS

KR    10-2004-0004726 A    1/2004

OTHER PUBLICATIONS

Krishnamurthi G. et al: "Using the Liberty Alliance Architecture to Secure IP-level Handovers", First International Conference on Communication System Software and Middleware (Comsware), Jan. 8, 2006, New Delhi, India, the whole document.

* cited by examiner

Primary Examiner — Gilberto Barron, Jr.
Assistant Examiner — Abdulhakim Nobahar (57) ABSTRACT

Methods and apparatus for facilitating access to public wireless access points in a fixed-mobile convergence system. A mobile terminal is pre-provisioned with one or more security parameters corresponding to one or more WLAN access points that the mobile terminal might need to access should a current WLAN access point fail or otherwise become unreachable. The WLAN access points are similarly pre-provisioned with a security parameter corresponding to the mobile terminal. With these pro-provisioned security parameters, the mobile terminal and any one of the potential target WLAN access points conduct an abbreviated authentication process in the event that a switch-over becomes necessary.

11 Claims, 6 Drawing Sheets

ENABLING SEAMLESS OFFLOADING BETWEEN WIRELESS LOCAL-AREA NETWORKS IN FIXED MOBILE CONVERGENCE SYSTEMS

BACKGROUND

The present invention generally relates to systems that provide wireless data services to mobile terminals through both local-area wireless networks and wide-area cellular networks, and more particularly relates to techniques for improving the seamless handover of devices from one local area wireless network to another.

There is an emerging need for a convergence between fixed wireless data networks, such as those operated in a residential or office environment, and mobile wireless data networks, such as the Long-Term Evolution (LTE) and High-Speed Packet Access (HSPA) networks standardized by the $3^{rd}$-Generation Partnership Project (3GPP). This industry trend, and the emerging technologies and standards to facilitate this convergence, are broadly known as "Fixed Mobile Convergence" (FMC). One example of an industry effort in the FMC arena is the work undertaken by the Broadband Forum (BBF), which is defining interworking requirements between the 3GPP Evolved Packet Core (EPC) architecture and the IP-centric architecture of the BBF.

The residential wireless local-area network (WLAN) is one key to the success of FMC, because it is often the most commonly used fixed network access for ordinary users. Thus, one objective of FMC is to connect mobile phones and other mobile wireless devices (referred to as user equipment, or UE, in 3GPP terminology) to the EPC through the residential network. Connectivity between the residential network WLAN and a wide-area network (WAN) and hence to the EPC is enabled by the so-called "residential gateway" (RGW), a relatively inexpensive networking device. One challenge is to provide network-based IP mobility management for 3GPP UEs that are attached to the residential network.

A driving factor behind FMC is the growing user demand for data-intense applications, which puts high demands on wide-area wireless networks. Thus, wireless operators are seeking reliable technologies for "offloading" some of this demand from the wide-area wireless networks to alternative networks, including residential and office wireless local-area networks (WLANs). With this approach, user data takes an alternate path available in the overlay network, reducing burden on the 3G radio access network. However, seamless transitions, as the wireless data user moves between a WAN and a WLAN, and back again, are extremely important.

To date, efforts to develop technologies for supporting wireless data offloading have focused on this seamless switching between wide-area access technologies, such as 3GPP's HSPA and LTE radio access networks, and WLAN. However, additional efforts are needed to improve seamless transitions as mobile devices move from one WLAN to another in an FMC network. Solutions for supporting seamless transitions between WLANs should be deployable at a large scale, and should preferably be centralized, allowing service providers to have full visibility and control over large areas and over a very high number of users.

SUMMARY

Methods and apparatus for facilitating access to public wireless access points are disclosed. A mobile terminal is pre-provisioned with one or more security parameters corresponding to one or more WLAN access points that the mobile terminal might need to access should a current WLAN access point fail or otherwise become unreachable. These WLAN access points are thus potential "handover" targets for the mobile terminal, and are similarly pre-provisioned with a security parameter corresponding to the mobile terminal. With these pro-provisioned security parameters, the mobile terminal and any one of the potential target WLAN access points can conduct an abbreviated authentication process in the event that a switch-over becomes necessary.

An example method, suitable for implementation in or by a mobile terminal, begins with the mobile terminal completing a first authentication procedure with a first access point for a first wireless local-area network (WLAN), to obtain services from the first wireless access point. The mobile terminal then receives, via the first WLAN access point, an identifier for a second wireless access point for a second WLAN. The mobile terminal also receives a first pre-provisioned security parameter corresponding to the second wireless access point, again via the first wireless access point. Subsequent to receiving this identifier and the pre-provisioned security parameter, the mobile terminal initiates a second authentication procedure with the second wireless access point and transmits a first authentication credential to the second wireless access point. This first authentication credential is equal to or is derived from the pre-provisioned security parameter.

In some embodiments, the first authentication credential is cryptographically derived from the first pre-provisioned security parameter, such as by using a hashing function. In some cases, an identifier for the mobile terminal is used in the cryptographic derivation of the first authentication credential, along with the first pre-provisioned security parameter. In any of these embodiments, the cryptographic derivation may be performed prior to initiating the second authentication procedure.

In several embodiments, the first authentication credential is the first pre-provisioned security parameter. In some of these embodiments, the method continues with the receiving of an authentication request from the second wireless access point, in response to the transmitted first authentication credential. The mobile terminal then transmits a second authentication credential to the second wireless access point, in response to the authentication request. The second authentication credential is cryptographically derived from a second pre-provisioned security parameter held by the mobile terminal.

In some embodiments of the invention, the authentication process includes authentication of the access point, at the mobile terminal. Thus, any of the methods summarized above may further include, in several embodiments, the receiving of a second authentication credential from the second wireless access point. The mobile terminal cryptographically derives a verification parameter from a stored parameter corresponding to the second wireless access point, in several of these embodiments, and verifies the second authentication credential by comparing it to the verification parameter. In some cases, the stored parameter used to obtain the verification parameter is the first pre-provisioned security parameter discussed above. Again, in some embodiments, the cryptographic derivation of the verification parameter may be performed ahead of time, i.e., prior to initiating the second authentication procedure.

Complementary methods carried out by a wireless access point are also disclosed. According to one example method, a wireless access point receives pre-authorization request from a provisioning server, the pre-authorization request comprising an identifier for a mobile terminal and a pre-provisioned security parameter corresponding to the mobile terminal. After receiving the pre-authorization request, the wireless access point receives access request from the mobile terminal, and sends an authentication message in response to the access request. The wireless access point then receives, in response to the authentication request, an authentication credential, and verifies the authentication credential using the pre-provisioned security parameter corresponding to the mobile terminal identifier. Network access is then granted to the mobile terminal, in response to verifying the authentication credential.

Several complementary methods carried out by a provisioning server are also disclosed. In one such method, the provisioning server receives a mobile terminal identifier for a mobile terminal accessing a first wireless access point and identifiers for one or more additional wireless access points observed by the mobile terminal. The provisioning server selects one of the additional wireless access points as a handover target for the mobile terminal, and sends an access point identifier for the selected wireless access point and a pre-provisioned security parameter derived from the mobile terminal identifier to the mobile terminal, via the first wireless access point.

Also disclosed are mobile terminal apparatus, wireless access point apparatus, and provisioning server apparatus, each adapted to carry out the various techniques summarized above and variants thereof. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

The invention will now be described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Thus, components or features from one embodiment may be assumed to be present or used in another embodiment, where such inclusion is suitable.

For purposes of illustration and explanation only, these and other embodiments of the present invention are described herein in the context of operating in a radio access network (RAN) that communicates over radio communication channels with wireless terminals (also referred to as user equipment, or "UEs"). It will be understood, however, that the present invention is not limited to such embodiments and may be embodied generally in any type of communication network. As used herein, the terms mobile terminal, wireless terminal, or UE can refer to any device that receives data from a communication network, and may include, but are not limited to, a mobile telephone ("cellular" telephone), laptop/portable computer, pocket computer, hand-held computer, and/or desktop computer.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs. High-Speed Packet Access (HSPA) technology, which includes High-Speed Downlink Packet Access (HSDPA) technology, is one component of the specifications for UTRAN.

The Third Generation Partnership Project (3GPP) has undertaken to further evolve the UTRAN and GSM based radio access network technologies. In this regard, specifications for the Evolved Universal Terrestrial Radio Access Network (E-UTRAN) have been released and are still being developed within 3GPP. The Evolved Universal Terrestrial Radio Access Network (E-UTRAN) comprises the Long Term Evolution (LTE) and System Architecture Evolution (SAE).

While terminology from 3GPP's specifications for LTE and UTRAN systems is used in this disclosure to exemplify embodiments of the invention, this should not be seen as limiting the scope of the invention to only these systems. Other wireless systems, including WiMax (Worldwide Interoperability for Microwave Access), UMB (Ultra Mobile Broadband), and GSM (Global System for Mobile Communications) may also benefit from exploiting embodiments of the present invention disclosed herein.

Figure 1:
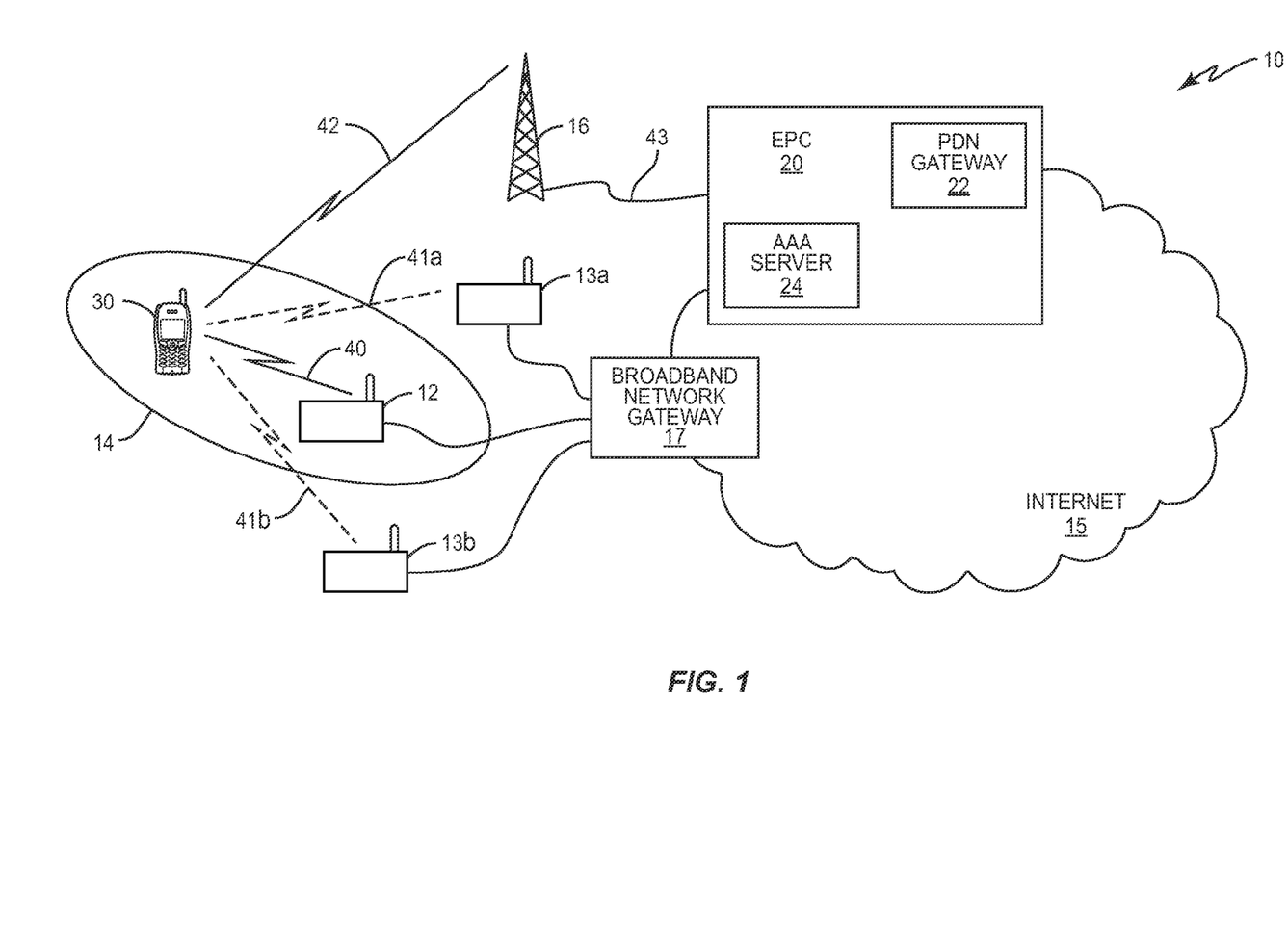
FIG. 1 is a block diagram illustrating some of the components of a communication system suitable for use in some embodiments of the present invention.

Turning now to the drawings, FIG. 1 illustrates a communication system 10 suitable for use in one embodiment of the present invention. As seen in FIG. 1, system 10 comprises an access node 12 for a WLAN network 14, which is connected to the Internet 15 via a Broadband Network Gateway 17. System 10 further includes an access point 16 for an LTE network, which also provides connectivity to the Internet 15 via a Packet Data Network (PDN) Gateway 22, which in turn is part of the Evolved Packet Core (EPC) 20, specifications for which have been developed by 3GPP.

A mobile terminal 30 configured according to the present invention can communicate with other communication devices, including other mobile terminals, application servers, and the like, utilizing the infrastructure of either the WLAN 14 or the LTE network, via a WLAN interface 40 or an LTE interface 42, respectively.

The communication system 10 illustrated in FIG. 1 also includes two additional WLAN access points 13a and 13b. These may be "public" access points, in some embodiments. While mobile terminal 30 is capable of communicating with WLAN access points 13a and 13b over interfaces 41a and 41b, respectively, mobile terminal 30 is generally unable to obtain services from the LTE/SAE network via these access points unless it has been properly authenticated to those access points, and may be unable to access the Internet through these access points until it has been properly authenticated and/or authorized.

The general operation of access nodes 12 in WLAN 14 is well-known in the art; however, a brief description is included herein for clarity. For more information on WLANs and the associated interfaces, the interested reader is directed to the document entitled, "IEEE Std. 802.11-2007," which was published on Jun. 12, 2007.

Access node 12 is a WLAN access point that provides the mobile terminal 30 with a connection to the Internet. The mobile terminal 30 communicates signaling messages to and from the access node 12 via a WLAN air interface 40 so that the mobile terminal 30 can exchange data packets with other devices operating in WLAN 14 or with other devices or services accessible through Internet 15. Typically, access point 12 in WLAN 14 allows mobile terminal 30 to move around within a predefined local coverage area without losing the connection to the access point 12.

LTE access point 16 is also a wireless node that provides mobile terminal 30 with communications and a connection to the Internet, over a predefined coverage area or "cell." Mobile terminal 30 may send and receive signaling and mobility messages to and from the access point 16, via an LTE air interface 42, to facilitate sending and receiving data packets with other devices operating in the LTE network or with other devices or services accessible through Internet 15. The LTE network typically comprises a plurality of entities referred to as eNodeBs, arranged in a "flat" architecture. Although not specifically shown, the eNodeBs are interconnected via an X2 interface. The eNodeBs, including access point 16, connect to the EPC network 20 via an S1 interface 43.

Mobile terminal 30's access to services provided by the LTE network is controlled by authentication, authorization, and accounting (AAA) functions in EPC 20. FIG. 1 illustrates a single AAA Server 24 for providing these functions, but it should be understood that these functions may be spread across several physical nodes in some networks. AAA Server 24 also provides provisioning, authentication, and authorization services for mobile terminals accessing FMC services via WLAN 14.

Figure 2:
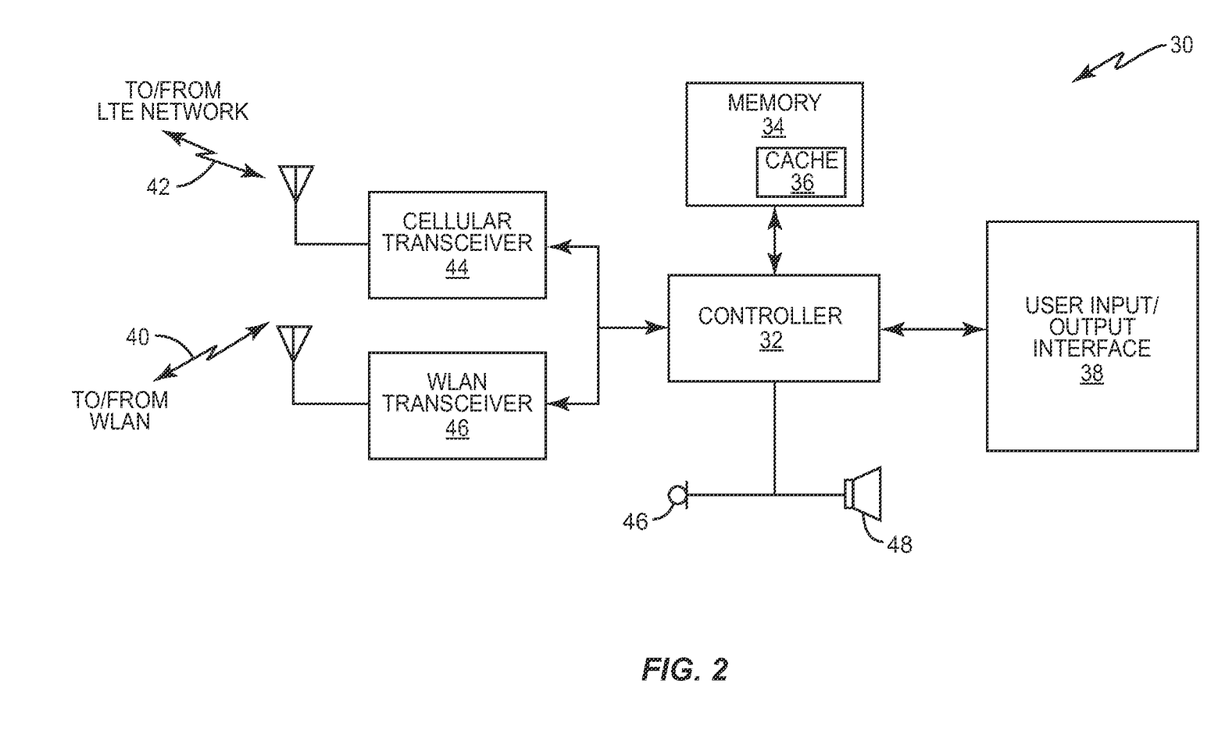
FIG. 2 is a is a block diagram illustrating some of the component parts of a mobile terminal configured to operate in the communication system of FIG. 1, according to several embodiments of the present invention.

FIG. 2 is a block diagram illustrating some of the main functional components of an exemplary mobile terminal 30 configured according to one embodiment of the present invention. Mobile terminal 30 comprises a controller 32, a memory 34 having a cache 36, a user input/output interface 38, a microphone 46, a speaker 48, a cellular transceiver 44, and a WLAN transceiver 46.

Controller 32 comprises one or more microprocessors, microcontrollers, hardware, or a combination thereof. Controller 32 executes programs and applications stored in memory 34, processes signals transmitted and received by the cellular transceiver 44 and the WLAN transceiver 46, and generally controls the overall operation of the mobile terminal 30. According to one embodiment of the present invention, the controller 32 switches between communicating over wireless interfaces 40, 41a, 41b, and 42, and generates one or more signaling and/or mobility messages to transmit over those interfaces. Memory 34 comprises one or more devices designed to store programs and data needed for operation of mobile terminal 30 on either a temporary, semi-permanent, or permanent basis. Exemplary memory devices may include, for example volatile memory (e.g., RAM) and/or nonvolatile memory (ROM, EEPROM, Flash). As seen in FIG. 2, memory 34 comprises a predefined area called a cache 36. As described in more detail herein, the controller 32 may generate an authentication credential for use in accessing a public WLAN access point, using a pre-provisioned security parameter received via a home WLAN access point and stored in cache 34.

User input/output (I/O) interface 38 includes input and output devices that enable a user to interact with and control mobile terminal 30. Although not specifically shown, the user I/O interface 38 may include a display to output information for viewing by the user and one or more input devices such as keypads, dials, wheels, function keys, and touch pads. Some mobile terminals 30 may include a touch screen display that also functions as an input device. Mobile terminal 30 will typically also include a microphone 46 to convert audible sounds into audio signals for input to the controller 32, and one or more speakers 48 to convert audio signals output by the controller 32 into audible sounds that can be heard by the user.

Cellular transceiver 44 comprises one or more fully functional cellular transceivers that enable the mobile terminal 30 to communicate over one or more of a variety of different cellular networks such as Wideband Code Division Multiple Access (WCDMA) networks, Long Term Evolution (LTE) networks, and WiMAX networks. WLAN transceiver 46 includes a relatively short-range radio transceiver that enables the mobile terminal to communicate with a nearby WLAN access point using, for example, one or more of the WLAN interfaces specified in the IEEE 802.11 family of standards.

As noted above, a key goal in the Fixed Mobile Convergence (FMC) model is to enable offloading of user traffic from the wide-area network whenever possible, without losing ongoing sessions and without sacrificing quality of service. In the most recent development of technology to support FMC offloading, the primary emphasis has been on technology for switching a mobile device user to a WLAN network, when possible. This WLAN network may be a public WLAN or a private one, such as the user's residential WLAN.

Unaddressed by previous development is the scenario in which a given user's WLAN connectivity breaks down, whether from equipment problems or because the user has moved out of range of the WLAN access point. Using the techniques described herein, the user's device can smoothly switch from one WLAN, such as the user's "home" WLAN, to another, "public" WLAN, without losing ongoing sessions.

One issue that arises in providing a seamless switch between WLANs is that the switch should occur with minimum latency and as seamlessly as possible, despite the absence of an IP mobility protocol such as MIPv6. Another issue is that the user's device should be able to use the same IP address as it used while attached to its own private WLAN network. Still another issue is to assure the network FMC operator that the switch to another WLAN is secure and should be authorized. Finally, the FMC operator should be assured that the device attaching to the "public" WLAN is the same device that is being disconnected from the user's It should be noted that if the 3GPP interface is unavailable to the mobile terminal for any reason then the only alternative to avoid tearing down ongoing sessions in the event of a failure of the WLAN serving the mobile terminal is for the mobile terminal to switch to a public WLAN. Consequently, it would be advantageous for an FMC operator to pre-provision a mobile device accessing services through a WLAN with credentials for accessing a selected public WLAN, to avoid any tearing down of ongoing sessions and to avoid any loss of data or unnecessary delays.

In the discussion that follows, several assumptions are generally made. However, these assumptions are made for the purpose of simplifying the present disclosure, and it will be understood that the inventive techniques described herein may be implemented even in systems where these assumptions do not hold.

First, it is generally assumed that the FMC infrastructure can immediately detect a RGW failure or other unavailability of an access point, regardless of geographical and topological locations. The present disclosure therefore does not describe any explicit procedure whereby a RGW is tested for reachability. Next, it is further assumed that the FMC infrastructure is aware of each RGW's load at any given time as well as the SSIDs associated with each RGW. In addition, the FMC infrastructure is also aware of Medium Access Control (MAC) and Internet Protocol (IP) addresses for available access points, as these are used in the techniques described herein to validate a mobile device's claims and to make the right selections for handing over a device. In some systems it may be useful for AAA servers in both fixed and mobile broadband infrastructures to be able to relay messages between each other so that, for example, a server in a fixed broadband network can play a proxy role. Finally, it is generally assumed that seamless mobility means retaining the same IP address regardless of the mobile device's point of attachment. Particular IP mobility protocols are out of scope of this disclosure.

Figure 3:
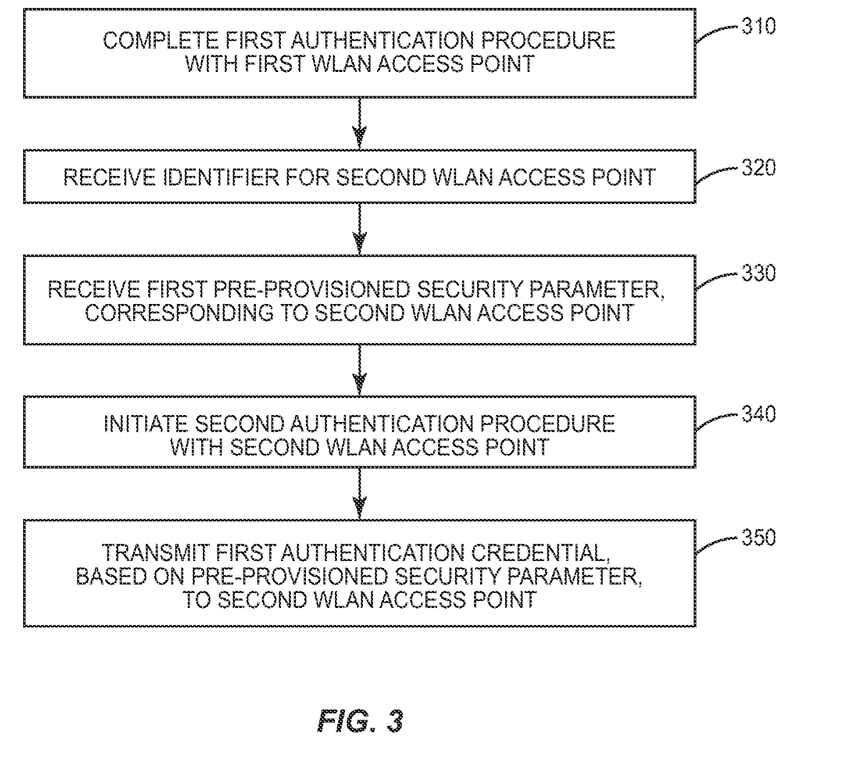
FIG. 3 is a process flow diagram illustrating an example technique for facilitating access to public wireless access points, as might be implemented in a mobile terminal according to several embodiments of the invention.

With the techniques disclosed herein, a mobile device can be seamlessly handed over from one WLAN to another. FIG. 3 is a process flow diagram illustrating a basic procedure according to some embodiments of the present invention.

First, it will be appreciated that when switching from the 3GPP network and attaching to a WLAN, such as the user's private access point, the user's mobile terminal must first authenticate itself to the new network. The same is true if a mobile terminal operating in the context of an FMC system initially requests services through a WLAN, rather than through a wide-area RAN. Thus, as shown at block 310, the illustrated process begins with the completion of a first authentication procedure with a first wireless local-area access point, for a first WLAN, to obtain services from the first wireless access point.

Upon successful authentication, at least one "backup" public SSID is selected by the AAA server, a provisioning server, or some other node in the FMC infrastructure. The corresponding access point's MAC address is conveyed to the mobile terminal, e.g., in an optional field carried by an authentication message. Thus, as shown at block 320, the mobile terminal receives, via the first wireless access point, an identifier for a second wireless access point. Any scheme for selecting a particular access point may be used. In some embodiments, the mobile device inserts into the authentication procedure a list of SSIDs and associated MAC addresses that it was able to detect during a scanning phase. This additional information can then be processed by the local AAA server or some other provisioning server, to maintain a database of available public WLANs that may be used for handover purposes. However, other techniques may be used to discover neighboring WLAN access points and/or to ensure that these access points are available for handover in the event that it is needed.

After the authentication phase, the mobile terminal is pre-provisioned with one or more access parameters for at least one alternative backup access point that it can use in case a handoff becomes necessary. Thus, as shown at block 330, the mobile terminal also receives, via the first wireless access point, a first pre-provisioned security parameter corresponding to a second wireless access point, for a second WLAN. In several embodiments, attachment parameters sent to the mobile terminal as part of or in relation to this pre-provisioning include the selected access point's MAC address and associated SSID. These parameters are stored in the mobile terminal's cache memory and should generally be removed/refreshed upon re-authentication.

In parallel to this pre-provisioning of the mobile terminal, the selected access point is also notified about the mobile terminal's MAC address and one or more additional security parameters, which are stored in the access point's cache memory. The notification process occurs via exchanging dedicated signaling messages between the AAA server and the selected access point, examples of which are described in further detail below.

This pre-provisioning of both the selected backup access point and the mobile terminal with special and unique credentials aims to remove the need for the mobile terminal to go through a full authentication procedure when switching to a selected access point, which would otherwise increase the handoff latency as well as the potential for packet loss. Thus, as shown at block 340, when the mobile terminal later needs to switch to the second wireless access point, it initiates a second authentication procedure with the second wireless access point. It then transmits a first authentication credential to the second wireless access point, as shown at block 350; this first authentication credential is either equal to or is derived from the pre-provisioned security parameter. As discussed in further detail below, because this authentication credential is related to the pre-provisioned security parameter, which in turn can be uniquely related to the second wireless access point, an abbreviated authentication procedure may be used, speeding authentication and reducing the possibility of excessive latencies or dropped packets.

In some embodiments, the authentication credential is cryptographically derived from the pre-provisioned security parameter, in some cases from the security parameter and an identifier for the mobile terminal. This derivation may be performed ahead of time, i.e., prior to initiating the authentication procedure with the backup access point, in some embodiments.

The authentication credential described above may be used at several points in an authentication procedure carried out between the mobile terminal and the backup access point. For example, in some embodiments the authentication credential discussed above is the pre-provisioned security parameter itself, and is used early in the access/authentication process as a "token" to signal to the access point that a fast authentication procedure is requested. In these embodiments, the wireless access point may respond with an authentication request, after which the mobile terminal sends a second authentication credential, which is cryptographically derived from a second pre-provisioned security parameter. In other embodiments, the authentication credential described in connection with FIG. 3 is cryptographically derived from the pre-provisioned security parameter and is sent in response to an explicit authentication request from the wireless access point.

Figure 4:
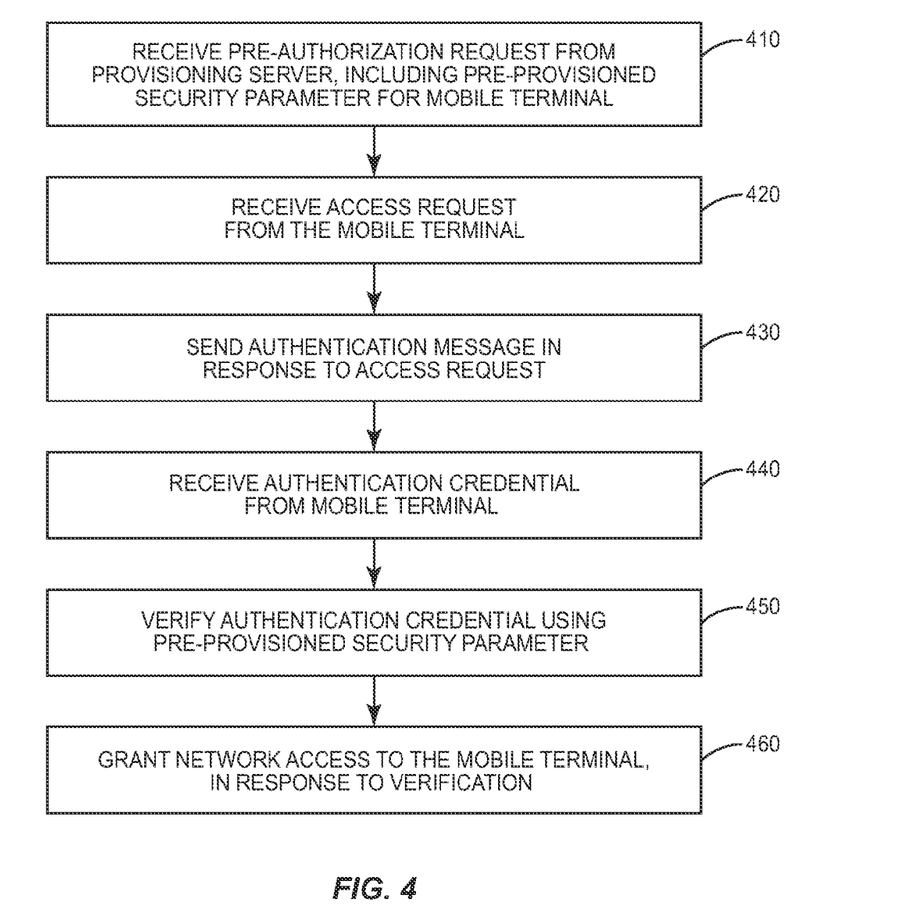
FIG. 4 is another process flow diagram, illustrating an example technique for facilitating access to public wireless access points as might be implemented in a wireless access point according to several embodiments of the invention.

FIG. 4, is a process flow diagram illustrating a corresponding procedure carried out at the second wireless access point, i.e., at a potential "target" access point. As shown at block 410, the illustrated process begins with the receiving of a pre-authorization request from a provisioning serve. The pre-authorization request includes an identifier for a mobile terminal and a pre-provisioned security parameter corresponding to the mobile terminal.

As shown at block 420, the wireless access point later receives an access request from the identified mobile terminal. In response, the wireless access point sends an authentication message, as shown at block 430. In response to the authentication message, the wireless access point then receives an authentication credential from the mobile terminal, as shown at block 440. The wireless access point verifies the authentication credential using the pre-provisioned security parameter corresponding to the mobile terminal identifier, as shown at block 450. As shown at block 460, the wireless access point then grants network access to the mobile terminal, in response to a successful verification of the authentication credential.

It will be appreciated that the mobile terminal need not have any awareness of the messages exchanged between the AAA server and the selected backup access point or points. Further, it should be noted that the lifetime assigned to the cached information in the selected backup access point should not exceed any lifetime associated to the mobile terminal's authentication when it attached to the first WLAN. Thus, it follows that the AAA server should periodically refresh the cached information according to the mobile terminal's activities and/or should request deleting the information if the mobile terminal moves away. For either or both of these purposes, the same signaling messages used to initially provision the backup access point with the mobile terminal's information may be used.

For pre-provisioning operations between the AAA server (or other provisioning server) and selected access points, three new signaling messages are introduced, as follows. Of course, the terminology associated with these new messages may differ in various embodiments of the present invention, as may the detailed contents of these messages.

A first message, referred to here as a "Pre-Auth_Request" (PAR) message, is sent by the AAA server to the selected access point. The PAR message carries the mobile terminal's MAC address and a "security access credential" (SAC), which may be computed from the mobile terminal's shared secrets and the selected access point's MAC address in some embodiments. The PAR message may also carry the mobile terminal's current IP address, or an IP address to be assigned to the mobile terminal, and a lifetime for the pre-provisioned information. In some embodiments, the PAR message carries an SSID for the user's private WLAN or other originating WLAN. Last but not least, the PAR message may also carry additional options for future use.

A second message, a "Pre-Auth_Confirm" (PAC) message, is sent by the selected access point to the AAA server in response to receiving a PAR message. Sending a PAC message indicates that the selected access point is willing to grant the mobile terminal quick access to the network and, in some embodiments, to assign the same IP address used on the private WLAN. In some embodiments, the selected access point checks to determine whether it can detect the originating SSID before sending a PAC message. The access point may then directly notify the AAA about the status of the originating SSID, such as by raising a flag in the PAR message.

A third message, a "Pre-Auth_Deny" (PAD) message, may be sent by the selected access point to the AAA server in response to receiving a PAR. The PAD message is used to notify the AAA that the selected access point is unable to accept the mobile terminal. In some embodiments, the PAD message may include an indicator as to the reason for the denial, such as a flag indicating that the originating SSID could not be detected by the selected access point.

A PAR message should preferably include a sequence number to avoid replays of the message. The same sequence number is echoed back in the PAC or PAD message. For maximum security, it is assumed that these messages are encrypted and/or authenticated.

The techniques described above can be used to pre-provision a mobile terminal with security parameters for one access point or for each of several access points, and to pre-provision each of those access points with an authentication credential for the mobile terminal. Later, if the user's RGW breaks down, the user's mobile terminal will scan for SSID(s) that match one of the one or more SSIDs stored in its cache, which through the processes above have been selected and pre-provisioned by the FMC infrastructure. The mobile terminal can then attach to the strongest one.

As suggested above, the authentication process used with the second access point can be significantly abbreviated. For instance, in some embodiments, after completing the link layer attachment and sending its own MAC address to the selected access point, the mobile terminal computes the authentication credential associated with the selected access point, from the pre-provisioned security parameter, and wait till it receives an authentication request, such as an Extensible Authentication Protocol (EAP) request, from the access point. Once the request is received, the mobile terminal sends the generated authentication credential in the response message (e.g., an EAP_response) sent to the access point. Note that adding the security credential in this initial response aims to request the access point to skip a full authentication procedure, which would normally require an exchange of information between the access point and an authentication entity in the FMC infrastructure before network access could be granted to the mobile terminal.

Upon receiving an 802.1× message carrying the additional parameters, the selected access point looks up the mobile terminal's MAC address in its cache memory and fetches the associated pre-provisioned parameter. If the two parameters are equal (or, alternatively, if the authentication parameter matches a verification credential derived from the pre-provisioned parameter for the mobile terminal), the access point replies with a successful authentication message and open the port. In parallel to sending a response to the mobile terminal, the new access point notifies the FMC infrastructure about the mobile terminal's attachment. The FMC infrastructure may decide to test whether the user's RGW is still alive or not, in order to detect and/or prevent any misbehavior.

The PDNGW will re-assigns the same IP address to the MN so that ongoing sessions won't detect the change. The PDNGW is able to determine that a handover is requested because the fast authentication is taking place.

Since the mobile terminal needs also to authenticate the selected access point, in several embodiments of the present invention the access point adds a special parameter, i.e., another authentication credential, which can be validated only by the mobile terminal, in one of the messages sent to the mobile terminal. The mobile terminal verifies this second authentication credential by comparing it to a stored parameter corresponding to the access point, or to a verification parameter cryptographically derived from a stored parameter for the access point. Again, this cryptographic derivation can be performed ahead of time, in some embodiments, to further speed up the mutual authentication process.

The mobile terminal and the selected access point thus authenticate each other by verifying an authentication credential sent by the other node. The particulars of this verification process can be carried out in any of several different ways. While a few examples follow, it will be appreciated that other verification techniques may be used, in some embodiments.

In one approach, the authentication parameter sent by the access point to the mobile terminal in the first authentication message is computed using a cryptographic function of the pre-provisioned security parameter associated with the mobile terminal and the access point's MAC address. A hashing function, such as the SHA function, is one example of such a cryptographic function. Thus, the transmitted authentication parameter might be computed as follows: AP_Secure_Param=First [128, SHA256 (mobile terminal's security credential|access point's MAC address)]. With this function, the mobile terminal's security credential is concatenated with the access point's MAC address, and the concatenated string is supplied to the SHA256 function. The first 128 bits of the hashing function's output are transmitted as the authentication parameter. A similar approach can be taken by the mobile terminal in computing its authentication parameter for transmission to the wireless access point, with the mobile terminal's MAC address substituted for the access point's MAC address.

Another way to authenticate the selected access would be via a cryptographic signing of the authentication message sent to the mobile terminal, using the RGW's certificate. In this case, the mobile terminal should be pre-provisioned with the RGW's fingerprint, for use in verifying the digital signature.

In another approach, the mobile terminal's security credential is computed using a secret key derived from an earlier authentication procedure, e.g., upon attachment to its own RGW), and the selected access point's MAC address. Thus, for example: MN_Security_Credential=First[128, SHA256 (Key|AP's MAC address)].

Alternatively, if the mobile terminal is also using a digital encryption certificate as part of a Private/Public Key Infrastructure (PKI), then it can sign the message.

In some embodiments the mobile terminal can continue to use the derived keys generated earlier, after authentication from its own RGW, in which case the keys should be pushed by the FMC infrastructure to the selected access point only upon notification of attachment. However, it is recommended to provision the mobile terminal with different keys for each selected access point. Even in this case, the selected access point should generally not receive a copy of these keys until after notifying the FMC about the mobile terminal's attachment.

Figure 5:
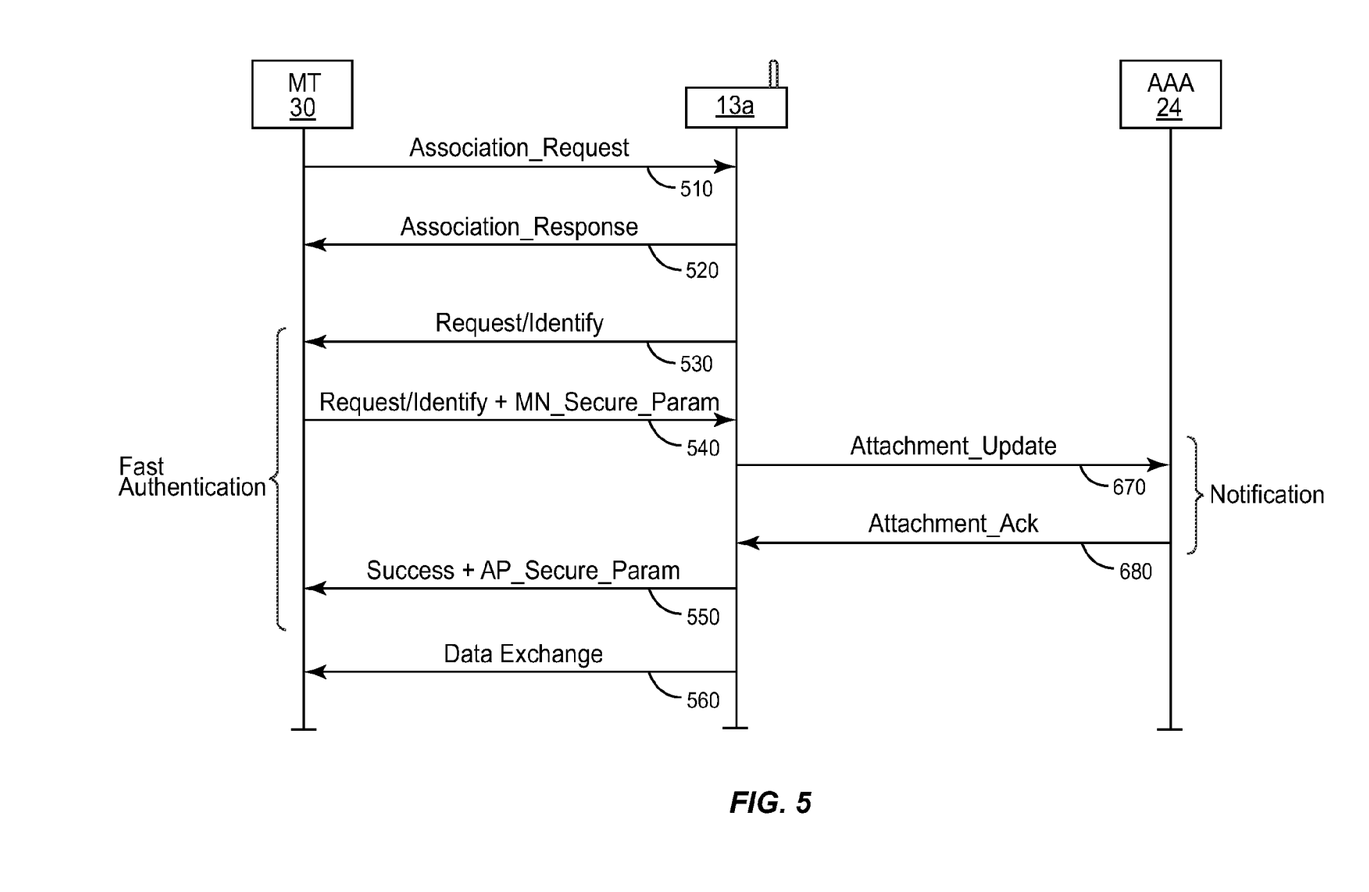
FIG. 5 is a message flow diagram illustrating the messages flowing between a mobile terminal and a WLAN access point, as well as the messages sent between WLAN access point 13a and an AAA server 30, according to some embodiments of the invention.

FIG. 5 is a message flow diagram illustrating the messages flowing between a mobile terminal 30 and a WLAN access point 13a, as well as the messages sent between WLAN access point 13a and an AAA server 30, in one example illustration of the techniques described above. The flow diagram assumes that terminal 30 has been pre-provisioned with a security parameter for the access point 13a, and that mobile terminal 30 is now attempting to switch to access point 13a from another WLAN.

Mobile terminal 30 first sends an association request frame, identified in FIG. 5 as message 510. This association request carries information about mobile terminal 30, such as requested data rates, and the SSID of access point 13a. In response, access point 13a sends an association response, message 520, which indicates that the association has been accepted and includes an association ID.

The access point 13a initiates authentication of mobile terminal 30 by sending an EAP-Request Identity frame, message 530. In response, mobile terminal 30 sends an EAP-Response Identity frame, message 540. As was described in detail earlier, this message carries the authentication credential that is equal to or is derived from the pre-provisioned security parameter supplied to mobile terminal 30 and corresponding to access point 13a. In some embodiments, this derivation is performed ahead of time. In either case, because it has been pre-provisioned with a security parameter for the mobile terminal, access point 13a is able to respond very quickly with an authentication success message, identified as message 550 in FIG. 5. This authentication success message may also include the authentication credential for the access point, for verification by mobile terminal 30. In parallel, access point 13a sends an attachment update (message 570) to AAA server 24, which responds with an acknowledgement (message 580). After this rapid authentication process is complete, data flow 560 can begin immediately.

The several techniques described above facilitate rapid authentication of a mobile terminal at a public WLAN when it switches from a private WLAN or from a previous public WLAN, enabling seamless continuity of services. Notably, the disclosed techniques are transparent to the mobile device user, and do not require user intervention at any time. Further, these techniques provide a centralization of the WLAN handover process, allowing the service provider to track offloading procedures and to make changes regarding offloading policies.

Embodiments of the present invention include various methods according to the techniques described above, including methods suitable for implementation in or by a mobile terminal for facilitating access to public wireless access points and complementary methods suitable for implementation by or in a wireless access point for a WLAN.

Other embodiments of the present invention include corresponding methods implemented by or in a provisioning server, which may be part of an AAA server, in some embodiments, or a separate physical entity, in others. One such method is pictured generally in the process flow diagram of FIG. 6. As shown at block 610, the method begins with the receiving of a mobile terminal identifier for a mobile terminal accessing a first wireless access point. As indicated at block 620, the provisioning server also receives identifiers for one or more additional wireless access points observed by the mobile terminal. These identifiers (e.g., SSIDs and/or MAC addresses) may be received from the mobile terminal, in some embodiments, or may be retrieved from a database, in others.

Figure 6:
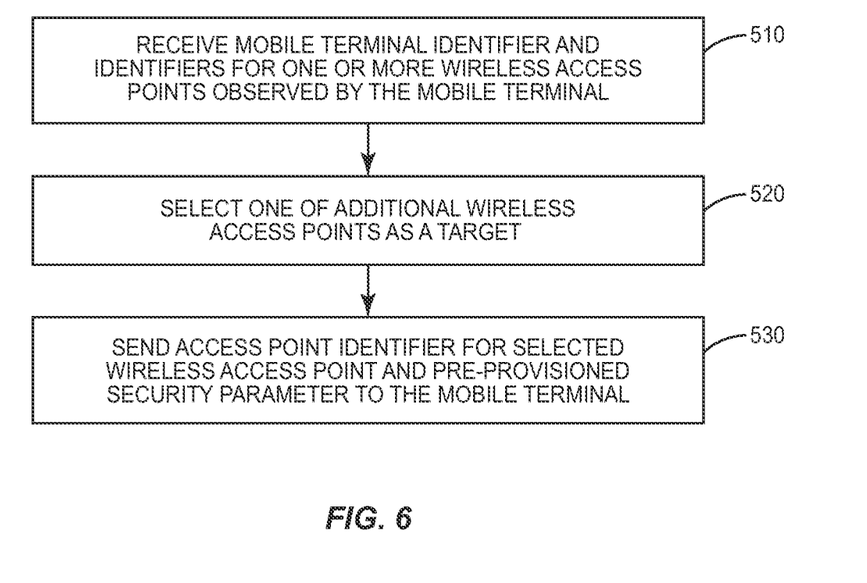
FIG. 6 is another process flow diagram, illustrating an example technique for facilitating access to public wireless access points as might be implemented in a provisioning server according to several embodiments of the invention.

As indicated at block 630, the provisioning server selects at least one of the additional wireless access points as a handover target for the mobile terminal. This selection may be based on factors such as known availability or unavailability of a given access point, loading information for the access points, etc. The method continues, as shown at block 640, with the sending of an access point identifier for the selected access point to the mobile terminal, along with a pre-provisioned security parameter derived from the mobile terminal identifier, via the first wireless access point.

In several embodiments, the method continues, as shown at blocks 650 and 660, with sending of a pre-authorization request to the selected wireless access point and the subsequent receipt of a reply. The pre-authorization request includes the mobile terminal identifier and a security access parameter corresponding to the mobile terminal and derived from an identifier for the selected wireless access point. The reply indicates whether the selected wireless access point will perform fast authentication for the mobile terminal.

Further embodiments of the present invention include mobile terminals, wireless access points, and provisioning servers, adapted to carry out one or more of the corresponding methods described above. A block diagram for an example mobile terminal 30 is given in FIG. 2, which was discussed in detail above. As noted in that discussion, a controller 32 is configured to carry out program instructions stored in a memory 34. In this manner, mobile terminal 30 is adapted to carry out any of the techniques described above, such as the process flow illustrated in FIG. 3 and the message flow of FIG. 5, and variants thereof.

As will be readily understood by those familiar with communications device design, several of the various functional blocks of mobile terminal 30 may be implemented using digital logic and/or one or more microcontrollers, microprocessors, or other digital hardware. Several of the functions may be implemented together, such as in a single application-specific integrated circuit (ASIC), or in two or more separate devices with appropriate hardware and/or software interfaces between them. Further, several of the functional elements of mobile terminal 30 may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that a wireless access point may include a processing circuit having a controller/memory architecture similar to that illustrated in FIG. 2. Thus, a wireless access point according to several embodiments of the present invention includes a WLAN transceiver, for communicating with one or more mobile devices, a broadband communications interface for connecting to the public data network (e.g., through a broadband network gateway), and a processing circuit configured to carry out one or more of the techniques described above, such as the processing flow illustrated in FIG. 4 and/or the message flow illustrated in FIG. 5. This processing circuit may comprise a controller/memory architecture configured in a manner similar to that pictured for controller 32 and memory 34 in FIG. 2.

Likewise, it will be further appreciated that a provisioning server according to embodiments of the present invention may also include a processing circuit having a controller/memory architecture similar to that illustrated in FIG. 2 and configured (e.g., with appropriate software) with program instructions for carrying out one or more of the techniques described above, such as the method illustrated in FIG. 6. Of course, this provisioning server will further include one or more communication interface circuits configured to communicate with other nodes in the FMC system, including the wireless access points and the mobile terminals (e.g., via the wireless access points).

With these and other variations and extensions in mind, it should be appreciated that the foregoing description and the accompanying drawings represent non-limiting examples of the methods and apparatus taught herein for facilitating access to public wireless access points in the context of a FMC system. As such, the inventive apparatus and techniques taught herein are not limited by the foregoing description and accompanying drawings. Instead, the present invention is limited only by the following claims and their legal equivalents.

What is claimed is:

1. A method, in a mobile terminal, for facilitating access to public wireless access points, the method comprising:
   completing a first authentication procedure with an a first access point for a first wireless local-area network (WLAN), to obtain services from the first wireless access point;
   receiving, via the first wireless access point, an identifier for a second wireless access point, for a second WLAN;
   receiving, via the first wireless access point, a first pre-provisioned security parameter corresponding to the second wireless access point;
   subsequent to receiving said identifier and said pre-provisioned security parameter, initiating a second authentication procedure with the second wireless access point; and
   transmitting a first authentication credential to the second wireless access point, wherein the first authentication credential is equal to or is derived from the pre-provisioned security parameter;
   wherein the first authentication credential is the first pre-provisioned security parameter, and wherein the method further comprises:
   receiving an authentication request from the second wireless access point, in response to the transmitted first authentication credential;
   transmitting a second authentication credential to the second wireless access point, in response to the authentication request, wherein the second authentication credential is cryptographically derived from a second pre-provisioned security parameter.

2. A method, in a mobile terminal, for facilitating access to public wireless access points, the method comprising:
   completing a first authentication procedure with an a first access point for a first wireless local-area network (WLAN), to obtain services from the first wireless access point;
   receiving, via the first wireless access point, an identifier for a second wireless access point, for a second WLAN;
   receiving, via the first wireless access point, a first pre-provisioned security parameter corresponding to the second wireless access point;
   subsequent to receiving said identifier and said pre-provisioned security parameter, initiating a second authentication procedure with the second wireless access point; and
   transmitting a first authentication credential to the second wireless access point, wherein the first authentication credential is equal to or is derived from the pre-provisioned security parameter;
   receiving a second authentication credential from the second wireless access point;
   cryptographically deriving a verification parameter from a stored parameter corresponding to the second wireless access point; and
   verifying the second authentication credential by comparing the second authentication credential to the verification parameter.

3. The method of claim 2, wherein said stored parameter is the first pre-provisioned security parameter.

4. The method of claim 2, wherein said cryptographically deriving the verification parameter is performed prior to initiating the second authentication procedure.

5. A method, in a wireless access point, the method comprising:
   receiving a pre-authorization request from a provisioning server, the pre-authorization request comprising an identifier for a mobile terminal and a pre-provisioned security parameter corresponding to the mobile terminal;

subsequent to receiving the pre-authorization request, receiving an access request from the mobile terminal and further comprising, subsequent to receiving the pre-provisioned security parameter from the provisioning server, sending to the provisioning server a pre-authorization confirmation message indicating that the wireless access point will perform fast authentication for the mobile terminal;

sending an authentication message in response to the access request;

receiving, in response to the authentication message, an authentication credential; and verifying the authentication credential using the pre-provisioned security parameter corresponding to the mobile terminal identifier; and granting network access to the mobile terminal, in response to verifying the authentication credential wherein the method further comprises determining whether the wireless access point can detect transmissions from an originating wireless access point identified in the pre-authorization request, and wherein the pre-authorization confirmation message comprises a flag indicating the result of said determining.

6. A method, in a provisioning server, for facilitating mobile terminal access to public wireless access points, the method comprising:

receiving a mobile terminal identifier for a mobile terminal accessing a first wireless access point and identifiers for one or more additional wireless access points observed by the mobile terminal;

selecting one of the additional wireless access points as a handover target for the mobile terminal;

sending an access point identifier for the selected wireless access point and a pre-provisioned security parameter derived from the mobile terminal identifier to the mobile terminal, via the first wireless access point;

sending a pre-authorization request to the selected wireless access point, the pre-authorization request comprising the mobile terminal identifier and a security access parameter corresponding to the mobile terminal and derived from an identifier for the selected wireless access point; and receiving a reply from the selected wireless access point, the reply indicating whether the selected wireless access point will perform fast authentication for the mobile terminal.

7. The method of claim 6, further comprising sending an update message to the selected wireless access point, the update message indicating that the security access parameter corresponding to the mobile terminal identifier should be deleted.

8. A mobile terminal, comprising:

a wireless local-area network transceiver, and a processing circuit, wherein the processing circuit is configured to control the wireless local-area network transceiver and to:

complete a first authentication procedure with an first access point for a first wireless local-area network (WLAN), to obtain services from the first wireless access point;

receive, via the first wireless access point, an identifier for a second wireless access point, for a second WLAN;

receive, via the first wireless access point, a first pre-provisioned security parameter corresponding to the second wireless access point;

subsequent to receiving said identifier and said pre-provisioned security parameter, initiate a second authentication procedure with the second wireless access point; and transmit a first authentication credential to the second wireless access point, wherein the first authentication credential is equal to or is derived from the pre-provisioned security parameter;

wherein the first authentication credential is the first pre-provisioned security parameter, and wherein the processing circuit is further configured to:

receive an authentication request from the second wireless access point, in response to the transmitted first authentication credential; and transmit a second authentication credential to the second wireless access point, in response to the authentication request, wherein the second authentication credential is cryptographically derived from a second pre-provisioned security parameter.

9. A mobile terminal, comprising:

a wireless local-area network transceiver, and a processing circuit, wherein the processing circuit is configured to control the wireless local-area network transceiver and to:

complete a first authentication procedure with an first access point for a first wireless local-area network (WLAN), to obtain services from the first wireless access point;

receive, via the first wireless access point, an identifier for a second wireless access point, for a second WLAN;

receive, via the first wireless access point, a first pre-provisioned security parameter corresponding to the second wireless access point;

subsequent to receiving said identifier and said pre-provisioned security parameter, initiate a second authentication procedure with the second wireless access point; and transmit a first authentication credential to the second wireless access point, wherein the first authentication credential is equal to or is derived from the pre-provisioned security parameter;

wherein the processing circuit is further configured to:

receive a second authentication credential from the second wireless access point;

cryptographically derive a verification parameter from a stored parameter corresponding to the second wireless access point; and verify the second authentication credential by comparing the second authentication credential to the verification parameter.

10. A provisioning server, comprising a processing circuit configured to:

receive a mobile terminal identifier for a mobile terminal accessing a first wireless access point and identifiers for one or more additional wireless access points observed by the mobile terminal;

select one of the additional wireless access points as a handover target for the mobile terminal; and send an access point identifier for the selected wireless access point and a pre-provisioned security parameter derived from the mobile terminal identifier to the mobile terminal, via the first wireless access point; wherein said processing circuit is further configured to:

send a pre-authorization request to the selected wireless access point, the pre-authorization request comprising the mobile terminal identifier and a security access parameter corresponding to the mobile terminal and derived from an identifier for the selected wireless access point; and receive a reply from the selected wireless access point, the reply indicating whether the selected wireless access point will perform fast authentication for the mobile terminal.

11. The provisioning server of claim 10, wherein said processing circuit is further configured to send an update message to the selected wireless access point, the update message indicating that the security access parameter corresponding to the mobile terminal identifier should be deleted.

* * * * *

UNITED STATES PATENT AND TRADEMARK OFFICE
CERTIFICATE OF CORRECTION

PATENT NO. : 8,931,067 B2  
APPLICATION NO. : 13/362977  
DATED : January 6, 2015  
INVENTOR(S) : Haddad et al.

Page 1 of 1

It is certified that error appears in the above-identified patent and that said Letters Patent is hereby corrected as shown below:

In the Drawings

In Fig. 5, Sheet 5 of 6, delete Tag "670" and insert Tag -- 570 --, therefor.

In Fig. 5, Sheet 5 of 6, delete Tag "680" and insert Tag -- 580 --, therefor.

In Fig. 6, Sheet 6 of 6, delete Tag "510" and insert Tag -- 610 --, therefor.

In Fig. 6, Sheet 6 of 6, delete Tag "520" and insert Tag -- 620 --, therefor.

In Fig. 6, Sheet 6 of 6, delete Tag "530" and insert Tag -- 630 --, therefor.

In the Specification

In Column 3, Line 53, delete "AAA server 30," and insert -- AAA server 24, --, therefor.

In Column 6, Line 11, delete "cache 34." and insert -- cache 36. --, therefor.

In Column 8, Line 63, delete "FIG. 4," and insert -- FIG. 4 --, therefor.

In Column 11, Line 33, delete "RGW)," and insert -- RGW, --, therefor.

In Column 11, Line 52, delete "server 30," and insert -- server 24, --, therefor.

In the Claims

In Column 14, Line 3, in Claim 1, delete "an a first" and insert -- a first --, therefor.

In Column 14, Line 34, in Claim 2, delete "an a first" and insert -- a first --, therefor.

In Column 15, Line 62, in Claim 8, delete "an first" and insert -- a first --, therefor.

In Column 16, Line 29, in Claim 9, delete "an first" and insert -- a first --, therefor.

Signed and Sealed this  
Twenty-eighth Day of July, 2015

Michelle K. Lee  
*Director of the United States Patent and Trademark Office*